Figure 9:
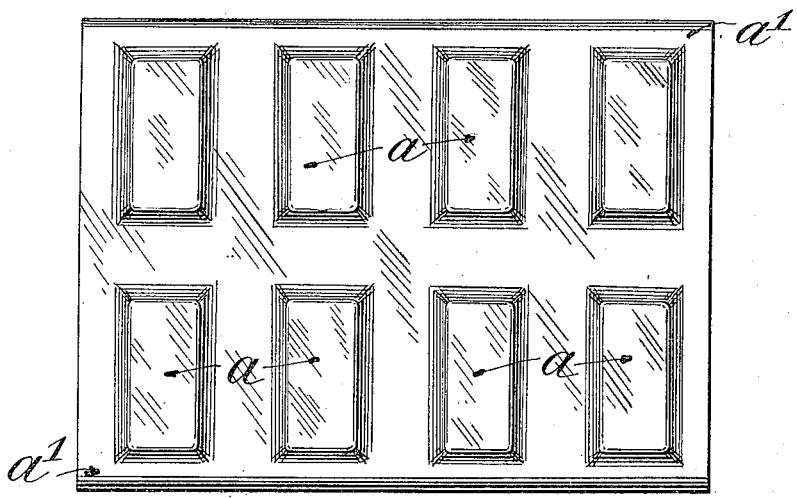

May 27, 1924.
A. G. MacK. JACK
1,495,595
FLEXIBLE RACK SUITABLE FOR USE IN SUSPENSION TRANSPORTER ARRANGEMENTS AND FOR OTHER PURPOSES
Filed Jan. 2, 1923
5 Sheets-Sheet 1
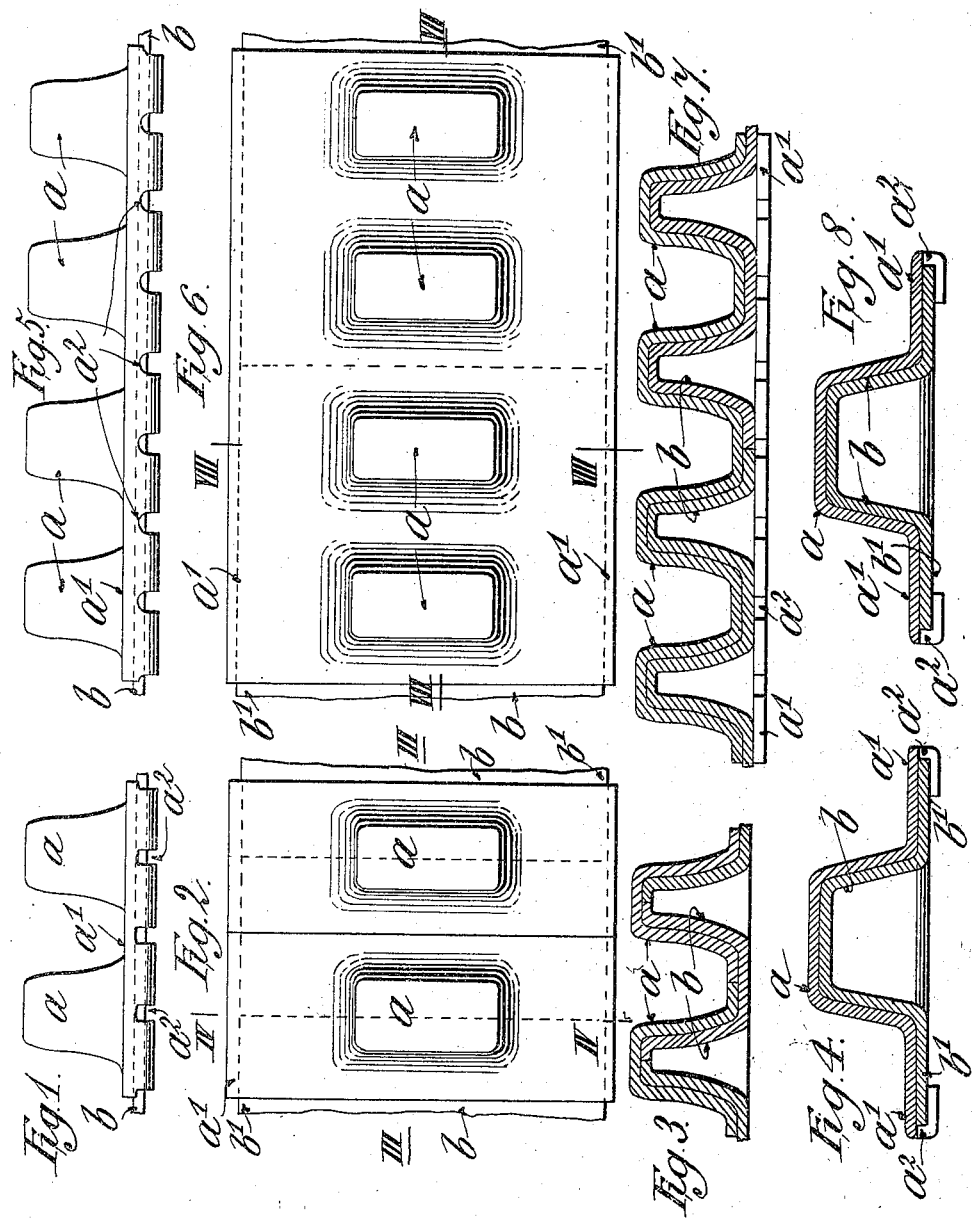

May 27, 1924.

A. G. MacK. JACK

FLEXIBLE RACK SUITABLE FOR USE IN SUSPENSION TRANSPORTER
ARRANGEMENTS AND FOR OTHER PURPOSES

Filed Jan. 2, 1923   5 Sheets-Sheet 3

Alexander George MacKenzie Jack
By Davis & Davis
Atty

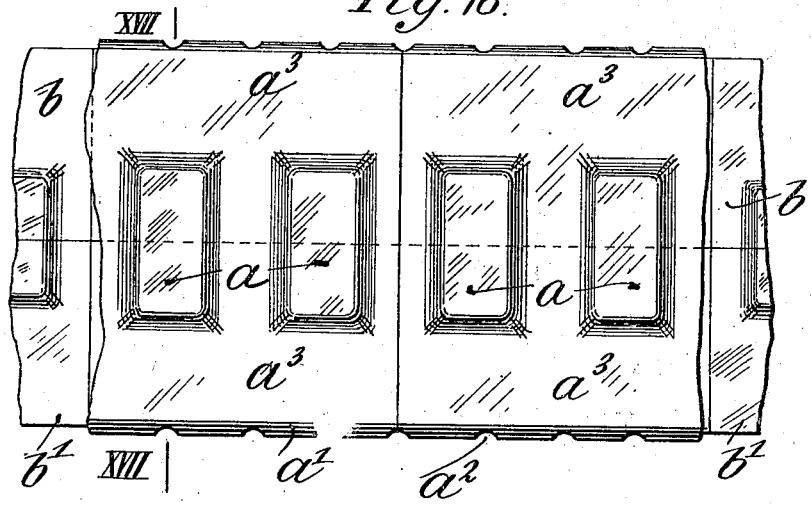
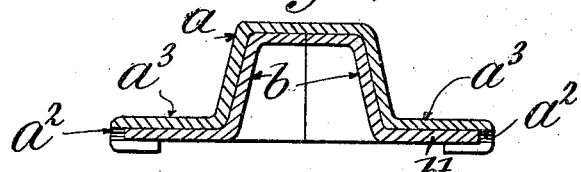
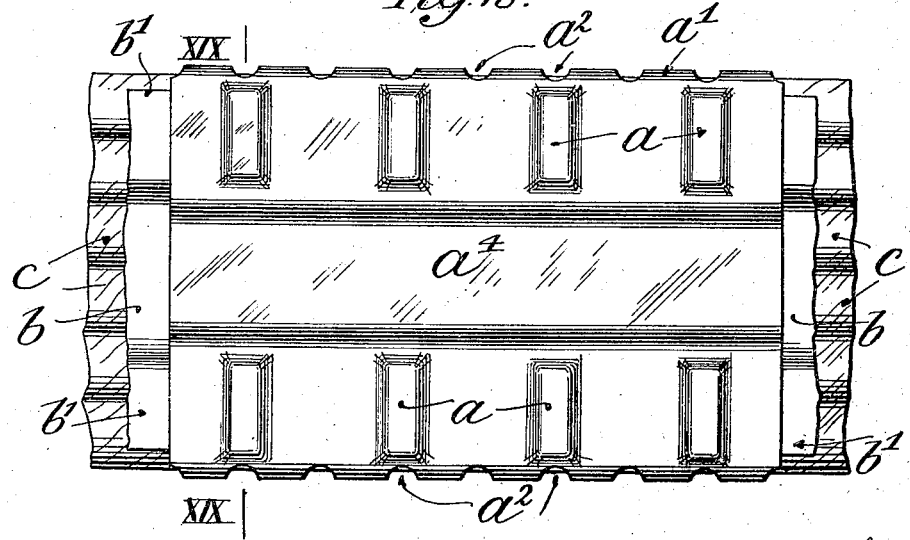

May 27, 1924.

A. G. MacK. JACK 1,495,595

FLEXIBLE RACK SUITABLE FOR USE IN SUSPENSION TRANSPORTER
ARRANGEMENTS AND FOR OTHER PURPOSES

Filed Jan. 2, 1923    5 Sheets-Sheet 5

Patented May 27, 1924.

1,495,595

UNITED STATES PATENT OFFICE.

ALEXANDER GEORGE MacKENZIE JACK, OF SHEFFIELD, ENGLAND.

FLEXIBLE RACK SUITABLE FOR USE IN SUSPENSION TRANSPORTER ARRANGEMENTS AND FOR OTHER PURPOSES.

Application filed January 2, 1923. Serial No. 610,307.

*To all whom it may concern:*

Be it known that I, ALEXANDER GEORGE MACKENZIE JACK, a subject of the King of Great Britain and Ireland, residing at Sheffield, in the county of York, England, have invented Improvements in or Relating to Flexible Racks Suitable for Use in Suspension Transporter Arrangements and for Other Purposes, of which the following is a specification.

In the specification of Letters Patent No. 1,463,165 dated 31st July 1923 granted to me for flexible supporting means suitable for use in suspension transporter arrangements and for other purposes, there are described various constructions of flexible racks suitable for use in suspension transporter arrangements of the kind described in the specification of Letters Patent No. 1,417,070, dated 23 March 1922, granted to me, for suspension transporter arrangements, each such flexible rack comprising broadly, a length of flexible metal provided with projections or teeth adapted, when the flexible rack is used in a suspension transporter arrangement of the kind referred to, to engage with and positively operate the gear wheels of a controller of the kind described in the said former specification No. 1,417,070 supra, when the controller is moved to and fro along the flexible rack. Each flexible rack comprises, according to the constructions of rack described in the said former specification No. 1,463,165 supra a series of metal sleeves, clips or sections provided with projections or teeth and firmly fixed to a rope or group of ropes with their teeth in proper alignment one with another to form one or more continuous rows of teeth, and adapted to allow of relative angular movement between them so as to permit of the flexible rack thus formed, assuming the form of a catenary when forming part of a suspension transporter arrangement of the kind referred to, and of bending at successive points along its length when a loaded controller travels along it.

Now the present invention has for its object to provide a flexible rack so constructed as to avoid any possibility of the pitch of the teeth on successive metal sleeves, clips or sections (hereinafter referred to as metal sections) varying from any cause and thereby preventing the rack teeth from properly meshing with the teeth of the wheels with which the rack is used.

For this purpose, according to the present invention, the adjacent toothed metal sections are adapted to be positively interlinked or locked together endways in a flexible manner by separate locking means connecting the adjacent metal sections, so that relative endways movement of the metal sections will at all times be effectually prevented and the pitch of the teeth along the rack maintained constant.

The interlinking or locking together of the successive metal sections by separate locking means for the purpose mentioned can be variously effected.

Conveniently, each section may be made of sheet or plate metal provided with one or more hollow teeth produced by stamping up the metal, and the adjacent metal sections be connected together endways by lengths or strips of sheet or plate metal each formed with one or more hollow projections or teeth and adapted to engage the metal sections from the underside thereof, each length or strip extending across the joint between two adjacent metal sections and engaging both sections so as to hold them together endways.

The number of teeth along the length of each of the metal sections and along each of the connecting strips or plates (hereinafter referred to as a link) may vary from one upward, according to requirement, and to suit the particular use to which the flexible rack composed of such sections and links is to be applied.

Figure 10:
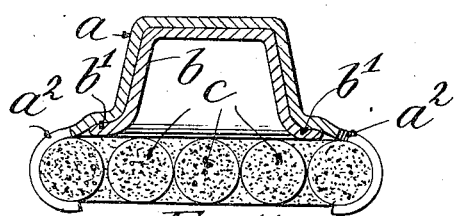
Figure 11:
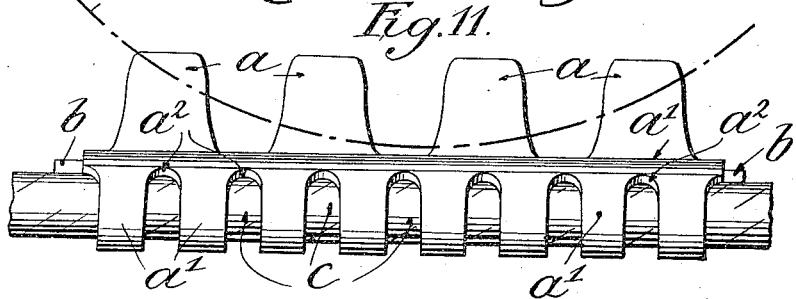
Figure 12:
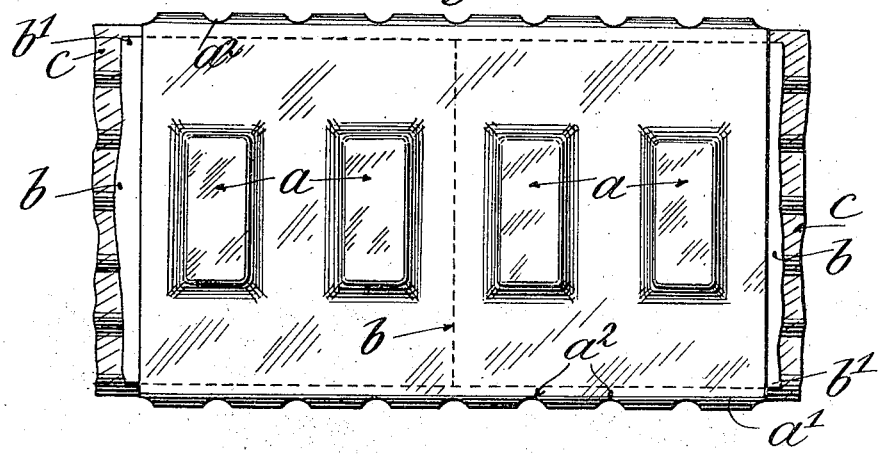
Figure 13:
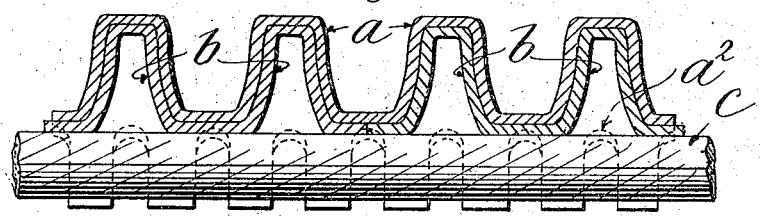
Figure 14:
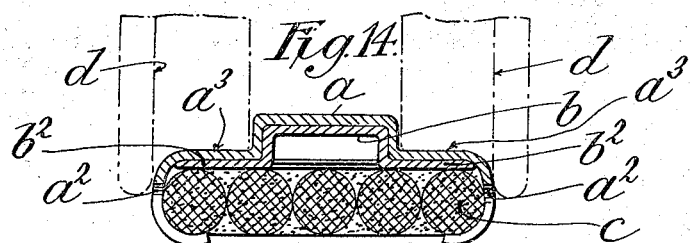
Figure 15:
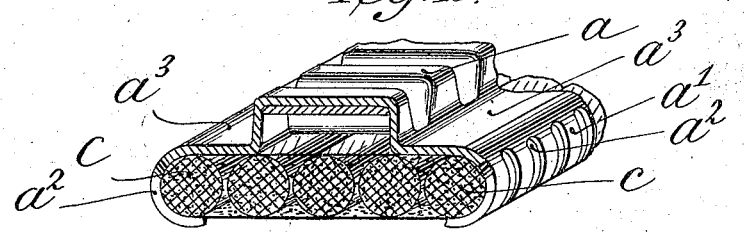
Figure 20:
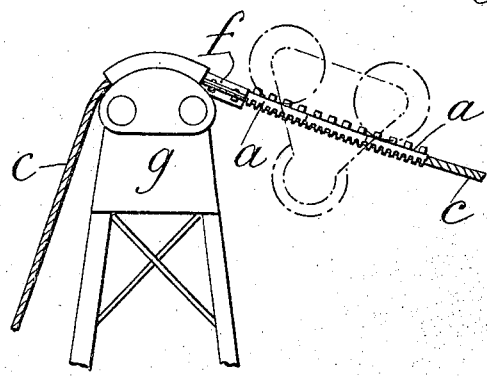
Figure 21:
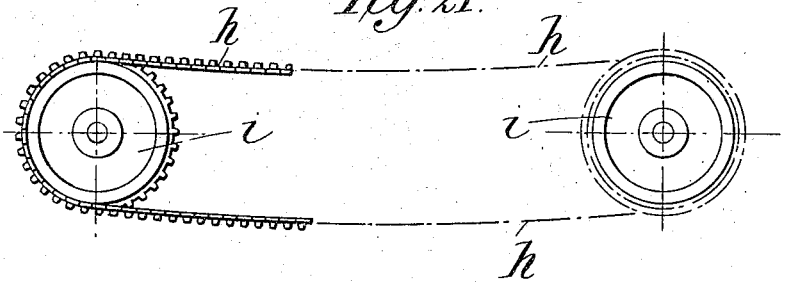

In the accompanying illustrative drawings, Fig. 1 is a side elevation, Fig. 2 a plan and Figs. 3 and 4 sections on the line III—III and IV—IV respectively, of Fig. 2, showing a portion of one construction of flexible rack according to the present invention. Figs. 5, 6, 7 and 8, are similar views to Figs. 1, 2, 3 and 4, respectively, showing another construction. Fig. 9 is a plan view showing a modification, Fig. 10 is a cross section showing another modified construction. Figs. 11, 12, 13 and 14, are similar views to Figs. 1, 2, 3 and 4 respectively, showing a portion of a construction of flexible rack according to the invention suitable for use in a suspension transporter arrangement of the kind hereinbefore referred to. Fig. 15 is a perspective view, partly in cross section, showing a modification. Fig. 16 shows in plan and Fig. 17 in cross section on the line XVII—XVII of Fig. 16, another modified construction, Fig. 18 is a plan and Fig. 19 a cross section on the line XIX—XIX of Fig. 18, showing another modification. Fig. 20 shows part of a suspension transporter arrangement comprising a flexible rack according to the invention. Fig. 21 shows in side elevation, another application of the flexible rack.

In each arrangement, $a$, $a$, are successive toothed metal sections and $b$, $b$, the toothed links for positively interlocking the sections together endway to form a flexible rack.

When the flexible rack is composed of connected sections $a$ and links $b$ each having only one hollow tooth, as shown in Figs. 1 to 4, inclusive, the tooth on each section $a$ will overlap and engage the adjacent side portions of inverted teeth on two adjacent links $b$ and the inverted hollow tooth of each link will overlap and engage with the adjacent sides of the teeth on two adjacent sections, the arrangement being reversely symmetrical. The side portions of the inverted tooth of each link may be regarded as hollow half teeth connected together by their root portions.

When each section and link is provided with two or more hollow teeth, as shown in Figs. 5 to 8 inclusive, then complete hollow teeth on each link $b$ will fit into complete hollow teeth on adjacent sections $a$ and vice versa so that the several sections and links will hold each other together endways.

Whatever the number of teeth in the sections and links adopted, the ends of adjacent toothed sections $a$ should always be in a line transverse to the length of the connecting link $b$ between such sections and at the centre of the length of such link, as shown, to obtain the best result.

Each toothed section $a$ and connecting link $b$ may be provided with a single tooth or with a single central row of teeth, as shown in Figs. 5 and 6, or with parallel rows of teeth as shown in Fig. 9, and be straight, or slightly curved in the direction of its length. The said sections and links can be held in effective engagement with one another in various ways, either directly, or indirectly, according to the particular construction of flexible rack desired and the purpose for which it is to be used.

Thus, the flexible rack may consist of interconnected toothed sections $a$ and links $b$ held together by edge portions $a^1$ of the sections $a$ being bent over and engaging the side portions $b^1$ of the links, as shown in Figs. 4 and 8, or vice versa. The said bent over edge portions $a^1$ of the sections $a$ or sections $a$ and links $b$, may be slit transversely, as shown in Figs. 1 and 5, where the bent over edge portions $a^1$ of the sections $a$ are split at $a^2$. Or, as shown in Fig. 10, the flexible rack may consist of toothed sections $a$ and links $b$ combined with a wire rope $c$ consisting of a single cable, or as in the example shown, of a group of cables, the toothed metal sections $a$ being securely engaged with the rope by means of the bent over slotted edge portions $a^1$, and the toothed links $b$ being held in position between the sections $a$ and rope, as shown in Figs. 13 and 14.

Flexible racks according to the present invention, although specially advantageous for use in suspension transporter arrangements of the kind hereinbefore referred to, are also applicable for use in connection with other apparatus where a flexible rack or chain is required for driving purposes.

For use in a suspension transporter arrangement of the kind herein referred to, the flexible rack may conveniently consist, as in the arrangement shown in Figs. 11 to 14 inclusive of a series of toothed metal sections $a$, a wire rope $c$ to which the sections are firmly secured as described, and between the sections and rope, a series of toothed connecting links $b$. Each section $a$ may be provided with a central row of teeth and at opposite sides thereof with plain marginal portions $a^3$ for wheels or rollers, shown in dotted lines at $d$ in Fig. 14, on a controller supported by the flexible rack, to travel upon, and with edge portions $a^1$ that are bent round and fixed to the opposite side or edge portions of the rope which, conveniently, may, as shown, be a flat wire rope formed of several ropes arranged side by side and connected together in known way. In this case the toothed connecting links $b$ may consist of strips of metal each having a centrally arranged row of projections or teeth to engage with the underside of the hollow teeth of two adjacent toothed sections $a$, as hereinbefore described, and plain flat marginal portions $b^2$ arranged between the plain flat marginal portions $a^3$ of the adjacent sections $a$ and the upper side of the flat wire rope $c$. Or, as shown in Fig. 15, the toothed connecting links $b$ may be made without plain marginal side portions and be located wholly below the central toothed portions of the sections $a$.

If desired, each toothed connecting link $b$ between each adjacent pair of toothed sections $a$ instead of being composed of one piece of metal as in the arrangements hereinbefore described, may, as shown in Figs. 16 and 17 be divided centrally along its length into two similar longitudinal portions, the projections or teeth on each portion being then half the internal width of the teeth on the sections $a$ with which they are engaged. In each case, the toothed sections $a$ and connecting links $b$ are interlocked with each other without the use of bolts or other like fastening devices. The plain edge portions $a^3$ of the toothed sections may be notched as in the other arrangements hereinbefore described, to facilitate their being bent around and under the side portions of the rope $c$.

Figure 19:
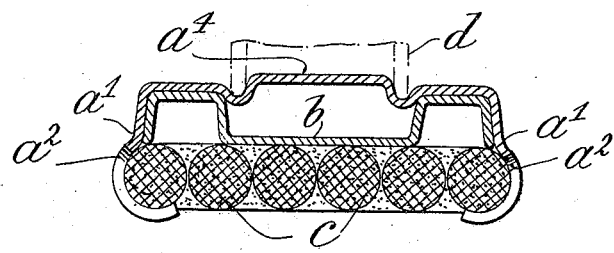

The toothed sections may, in some cases, and as shown in Figs. 18 and 19 be constructed to form two marginal rows of teeth with a raised plain tread portion $a^4$ between them for the plain peripheries of supporting wheels or rollers $d$ on the controller to run on, the toothed connecting links $b$ being suitably modified to engage with the underside of such teeth.

The supporting wheels or rollers $d$ on the controller will usually be so mounted as to rotate independently of the gear wheels $e$ (Fig. 11) on the controller that engage with the teeth on the flexible rack, as in the constructions of suspension transporter arrangements described in the said former specifications, though they may, if desired, be attached to and rotate with the gear wheels but not with so advantageous a result.

Any possibility of the interconnected toothed sections $a$ moving endways as a whole along the rope $c$ to which they are secured, may be prevented by metal distance pieces $f$ (Fig. 20) fixed to the rope $c$ between the toothed end sections $a$ and the supports $g$ from which the flexible rack is suspended, as in the construction of suspension transporter arrangements described in the said former specifications.

As hereinbefore indicated, flexible racks according to the invention can be used for purposes other than in suspension transporter arrangements. Thus, as shown in Fig. 21, such a flexible rack, indicated at $h$, may have its ends connected together to form an endless flexible rack or chain and be used with toothed wheels $i$ for transmitting motion from one shaft to another, after the manner of an endless chain in a road vehicle and other apparatus of various kinds. In such applications, the use of a wire rope or ropes for carrying the toothed sections and links may sometimes be dispensed with, sufficient strength, and freedom of bending movement, being provided in each case between the sections and links to permit the flexible rack, as a whole, to transmit the necessary power and to bend around the toothed wheels with which it is used. In this case the teeth of the toothed wheels may enter the hollow teeth in the connecting links.

What I claim is:—

1. A flexible rack composed of toothed metal sections, wherein the adjacent toothed sections are positively interlinked or locked together endways in a flexible manner by separate toothed links connecting the adjacent sections endways, substantially as described for the purpose set forth.

2. A flexible rack according to the preceding claim, wherein each toothed section is made of sheet or plate metal formed with one or more hollow teeth and adjacent sections are connected together endways by links formed of lengths or strips of sheet or plate metal formed with one or more hollow projections or teeth adapted to engage the metal sections from the underside thereof, substantially as described.

3. A flexible rack according to claim 1, wherein the toothed sections and toothed connecting links are held directly in engagement with one another, substantially as described.

4. A flexible rack according to claim 1, wherein the toothed sections and toothed connecting links are combined with a rope, the toothed sections being engaged with the rope by means of bent over edge portions and the toothed links being held in position between the toothed sections and rope, substantially as described.

5. A flexible rack according to claim 1, having a central row of teeth and at opposite sides thereof, plain marginal portions for wheels or rollers on a controller to travel upon, substantially as described.

6. A flexible rack according to claim 1, having transverse teeth extending along its length and a plain portion suitable for wheels or rollers on a controller to travel upon, substantially as described.

7. A flexible rack according to claim 1, wherein the toothed connecting links are divided longitudinally into two portions, substantially as described.

8. A flexible rack according to claim 1, wherein the ends of adjacent toothed sections are in a line transverse to and at the centre of the length of the corresponding toothed connecting link, substantially as described.

9. A flexible rack comprising adjacent toothed metal sections, a flat rope firmly engaged with the marginal portions of said sections and separate toothed links interconnected with the toothed sections and arranged between them and said rope.

10. A flexible rack comprising adjacent metal sections having transverse teeth along the length thereof and a longitudinally extending plain surface, a flat rope firmly secured to the marginal portions of said sections and separate toothed links interconnected with the toothed sections and arranged between them and said rope.

11. A flexible rack comprising adjacent metal sections having thereon a central row of teeth and at opposite sides thereof, plain marginal portions suitable for wheels or rollers to travel upon, a flat rope firmly secured to the marginal portions of said toothed metal sections, and separate toothed links interconnected with said toothed sections and arranged between them and said rope.

12. A flexible rack comprising adjacent metal sections having thereon a row of hollow teeth and at opposite sides of said row of teeth, plain marginal portions suitable for wheels or rollers to travel upon, a flat wire rope firmly engaged with turned over marginal portions of said metal sections and separate links having centrally arranged teeth interconnected with the hollow teeth of said sections and plain marginal portions arranged between the plain marginal portions of said sections and the rope.

Signed at the U. S. consulate, Sheffield, England, this the fourteenth day of December, 1922.

ALEXANDER GEORGE MacKENZIE JACK.